(12) United States Patent
Boerrigter et al.

(10) Patent No.: US 9,783,738 B2
(45) Date of Patent: Oct. 10, 2017

(54) HYDROCARBON RECOVERY FROM FISCHER-TROPSCH OFF-GAS

(71) Applicant: SHELL OIL COMPANY, Houston, TX (US)

(72) Inventors: Harold Boerrigter, Amsterdam (NL); Andreas Kustosz, Amsterdam (NL); Andres Eduardo Leonardi, Amsterdam (NL); Lionel Paul Ramone, Amsterdam (NL); Wilhelmus Hendrikus Johannes Balk, Amsterdam (NL); Pascal Edzo Armin Rots, Doha (QA)

(73) Assignee: SHELL OIL COMPANY, Houston, TX (US)

( * ) Notice: Subject to any disclaimer, the term of this patent is extended or adjusted under 35 U.S.C. 154(b) by 330 days.

(21) Appl. No.: 14/415,123

(22) PCT Filed: Jul. 22, 2013

(86) PCT No.: PCT/EP2013/065432
§ 371 (c)(1),
(2) Date: Jan. 15, 2015

(87) PCT Pub. No.: WO2014/013087
PCT Pub. Date: Jan. 23, 2014

(65) Prior Publication Data
US 2015/0203766 A1    Jul. 23, 2015

(30) Foreign Application Priority Data

Jul. 20, 2012  (EP) .................................. 12177318

(51) Int. Cl.
| | | |
|---|---|---|
| *C10G 2/00* | (2006.01) | |
| *C01B 3/52* | (2006.01) | |
| *C10G 67/04* | (2006.01) | |
| *C10K 1/18* | (2006.01) | |
| *C10G 21/14* | (2006.01) | |
| *C01B 3/34* | (2006.01) | |
| *C01B 3/48* | (2006.01) | |
| *C10G 45/58* | (2006.01) | |
| *C10G 47/00* | (2006.01) | |
| *C10G 67/14* | (2006.01) | |

(52) U.S. Cl.
CPC .................. *C10G 2/00* (2013.01); *C01B 3/34* (2013.01); *C01B 3/48* (2013.01); *C01B 3/52* (2013.01); *C10G 2/30* (2013.01); *C10G 2/32* (2013.01); *C10G 21/14* (2013.01); *C10G 45/58* (2013.01); *C10G 47/00* (2013.01); *C10G 67/049* (2013.01); *C10G 67/14* (2013.01); *C10K 1/18* (2013.01); *C01B 2203/0216* (2013.01); *C01B 2203/0233* (2013.01); *C01B 2203/0244* (2013.01); *C01B 2203/0283* (2013.01); *C01B 2203/043* (2013.01); *C01B 2203/0475* (2013.01); *C01B 2203/065* (2013.01); *Y02C 10/06* (2013.01); *Y02P 30/40* (2015.11)

(58) Field of Classification Search
CPC .............. C01B 3/52; C01B 2203/0216; C01B 2203/0233; C01B 2203/0244; C01B 2203/0283; C01B 2203/043; C01B 2203/0475; C01B 2203/065; C10G 2/30; C10G 2/32; C10G 21/14; C10G 67/14; C10G 45/58; C10G 47/00; C10G 67/049
See application file for complete search history.

(56) References Cited

U.S. PATENT DOCUMENTS

| | | |
|---|---|---|
| 6,306,917 B1 | 10/2001 | Bohn |
| 2008/0021118 A1 | 1/2008 | Inga et al. |
| 2011/0306682 A1 | 12/2011 | Tasaka |

FOREIGN PATENT DOCUMENTS

| | | |
|---|---|---|
| EP | 1887072 A1 | 2/2008 |
| EP | 2402418 A1 | 1/2012 |

OTHER PUBLICATIONS

PCT International Search Report, Application No. PCT/EP2013/065432 dated Sep. 3, 2013.
David R. Lide, ed., "Periodic Table of the Elements", in CRC Handbook of Chemistry and Physics, Internet Version 2005, <http://www.hbcpnetbase.com>, CRC Press, Boca Raton, FL, 2005.

*Primary Examiner* — Jafar Parsa

(57) ABSTRACT

The invention pertains to a method for processing a Fischer-Tropsch off-gas wherein Fischer-Tropsch off-gas is contacted with a wash fluid in a scrubber, and wherein the wash fluid is recycled in a closed loop with a dedicated scrubber, stripper and splitter. The wash fluid preferably is kerosene or LDF. The $C_{3+}$ hydrocarbons that are recovered from the off-gas are, together with other Fischer-Tropsch product, subjected to hydrocracking or hydrocracking/hydroisomerization. Additionally, hydrogen is recovered from the off-gas.

7 Claims, 1 Drawing Sheet

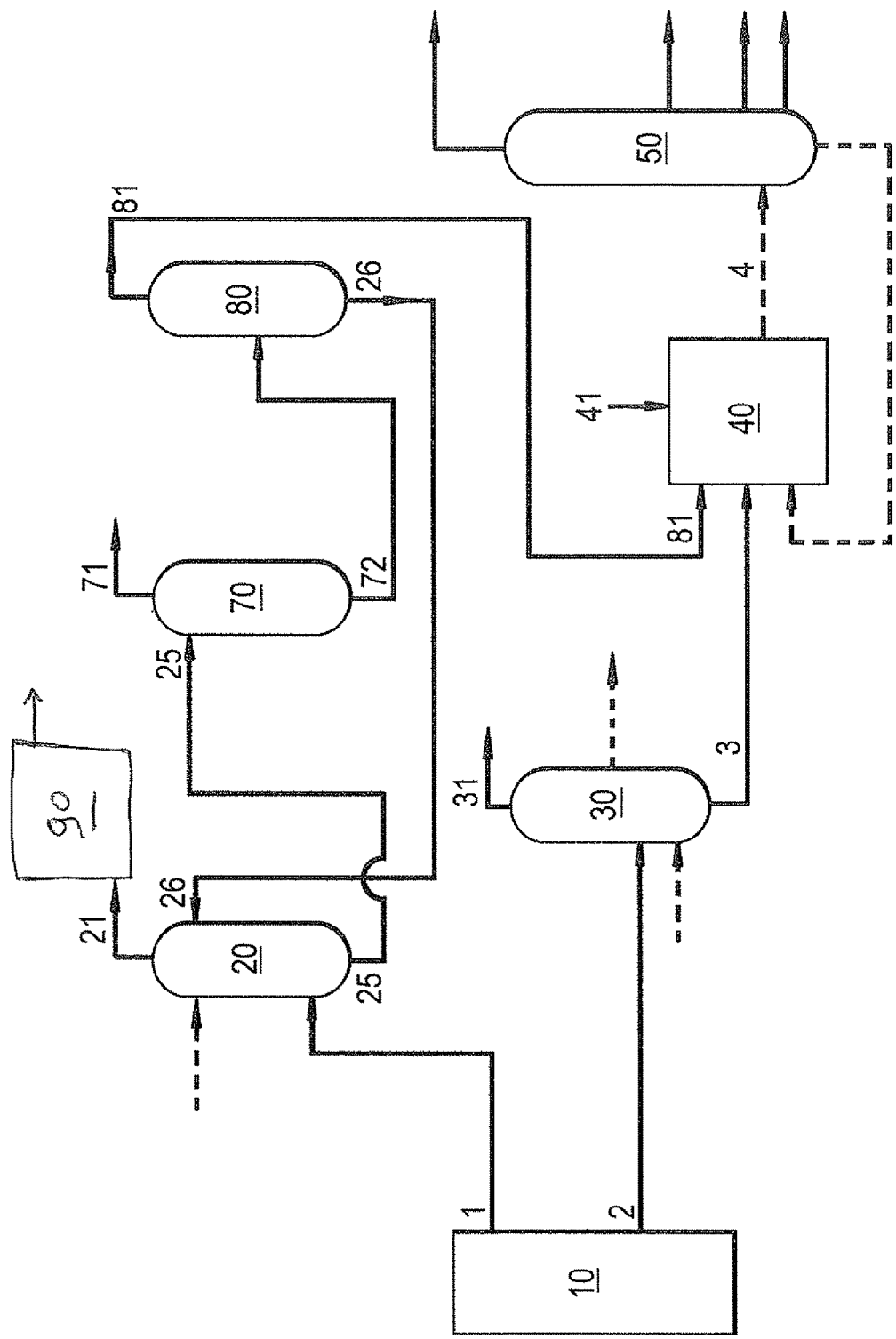

HYDROCARBON RECOVERY FROM FISCHER-TROPSCH OFF-GAS

CROSS-REFERENCE TO RELATED APPLICATIONS

The present application is a National Stage (§371) of International Application No. PCT/EP2013/065432, filed Jul. 22, 2013, which claims priority from European Application No. 12177318.8, filed Jul. 20, 2012, the disclosures of each of which are hereby incorporated by reference in their entirety.

FIELD OF THE INVENTION

The present invention relates to a method for processing a Fischer-Tropsch off-gas. In the method hydrocarbons and hydrogen are recovered from Fischer-Tropsch off-gas. The present invention particularly aims at the recovery of $C_3+$ hydrocarbons from Fischer-Tropsch off-gas, and an optimal processing to recover hydrogen.

BACKGROUND OF THE INVENTION

The Fischer-Tropsch process can be used for the conversion of synthesis gas (from hydrocarbonaceous feed stocks) into liquid and/or solid hydrocarbons. Generally, the feed stock (e.g. natural gas, associated gas and/or coal-bed methane, heavy and/or residual oil fractions, coal, biomass) is converted in a first step into a mixture of hydrogen and carbon monoxide; this mixture is often referred to as synthesis gas or syngas. The synthesis gas is then fed into a reactor where it is converted in one or more steps over a suitable catalyst at elevated temperature and pressure into paraffinic compounds and water. The obtained paraffinic compounds range from methane to high molecular weight hydrocarbons. The obtained high molecular weight hydrocarbons can comprise up to 200 carbon atoms, or, under particular circumstances, even more carbon atoms.

Numerous types of reactor systems have been developed for carrying out the Fischer-Tropsch reaction. For example, Fischer-Tropsch reactor systems include fixed bed reactors, especially multi-tubular fixed bed reactors, fluidized bed reactors, such as entrained fluidized bed reactors and fixed fluidized bed reactors, and slurry bed reactors such as three-phase slurry bubble columns and ebulated bed reactors.

During a Fischer-Tropsch process paraffinic compounds of different weights are formed. Additionally water is formed. When product is withdrawn from a Fischer-Tropsch system in most processes some unconverted syngas leaves the system as well. Further, gaseous components such as carbon dioxide, nitrogen and argon may leave the system when product is withdrawn from a Fischer-Tropsch system. Gaseous components such as carbon dioxide, nitrogen and argon may, for example, be present in the syngas used for the Fischer-Tropsch reaction.

Often some off-gas is removed from a Fischer-Tropsch process, regardless the number of recycles and regardless the number of Fischer-Tropsch reactors in the Fischer-Tropsch process. All or a part of the removed off-gas may be used as fuel, for example as fuel for furnaces. It is desired that at least a part of the valuable $C_3+$ hydrocarbons is removed from the Fischer-Tropsch off-gas before the off-gas is used as fuel or before it is disposed of.

US 2011/0306682 A1 discloses a method for recovering hydrocarbon compounds from a gaseous by-product of a Fischer-Tropsch synthesis reaction. An absorption solvent including liquid hydrocarbons is used to absorb hydrocarbon compounds. A carbon dioxide gas absorbent is used to remove the carbon dioxide gas. The carbon dioxide gas absorbent may contain amines such as alkanol-amines. The gaseous by-product is fed to an absorber (112) comprising a mixture of the carbon dioxide gas absorbent and the liquid hydrocarbon compounds. The CO2 absorbent (with the absorbed CO2) and the hydrocarbon compounds are separated in a separator (115). The CO2 is stripped off using heat (114), and the CO2 absorbent is reused. The absorbed light hydrocarbons are recovered (116) and the liquid hydrocarbons are reused.

Disadvantages of the process disclosed in US 2011/0306682 A1 are that two absorbers are required, heat and thus energy are required to strip off the CO2 from the absorbent, and the line-up is relatively complex.

An object of the present invention is to recover hydrocarbons and hydrogen from Fischer-Tropsch off-gas. The present invention particularly aims at the recovery, or removal, of $C_3+$ hydrocarbons, and optionally also $C_3+$ oxygenates, from Fischer-Tropsch off-gas. The present invention further aims at an optimal processing of the off-gas to recover hydrogen. Preferably the process is energy-efficient, and preferably the process is performed in a relatively simple line-up.

The present invention particularly aims at the recovery of $C_3+$ hydrocarbons and hydrogen from Fischer-Tropsch off-gas comprising hydrogen, carbon monoxide, carbon dioxide, nitrogen, methane, ethane and $C_3+$ hydrocarbons. The off-gas may additionally comprise other components such as argon. The gas may comprise oxygenates. In case the off-gas comprises $C_3+$ oxygenates, $C_3+$ oxygenates may also be removed with the process of the present invention.

SUMMARY OF THE INVENTION

The present invention provides a method for processing a Fischer-Tropsch off-gas comprising the following steps:
a) catalytic conversion of synthesis gas using a Fischer-Tropsch catalyst into a Fischer-Tropsch product comprising hydrocarbon products having 1 up to 1000 or more carbon atoms, preferably 1 up to 1000 carbon atoms;
b) separating the Fischer-Tropsch product of step a) into
   at least one hydrocarbon product stream comprising hydrocarbons with at least 3 and up to 1000 or more carbon atoms, preferably 3 up to 1000 carbon atoms, carbon monoxide, and carbon dioxide, and
   a Fischer-Tropsch off-gas, said Fischer-Tropsch off-gas comprising hydrogen, carbon monoxide, carbon dioxide, nitrogen, methane, ethane, and hydrocarbons with 3 to 9 carbon atoms,
whereby the hydrocarbon product stream comprises less carbon monoxide and carbon dioxide than the off-gas, and whereby the off-gas comprises less hydrocarbons with 3 to 9 carbon atoms than the hydrocarbon product stream;
c) providing a feed comprising at least a part of the hydrocarbon product stream obtained in step b) to a separator;
d) separating at least a part of the hydrocarbon product stream obtained in step b) in the separator of step c) into at least one light stream and one heavy stream, said light stream preferably comprising carbon monoxide and carbon dioxide and said heavy stream preferably comprising hydrocarbons with at least 3 and up to 1000 or more carbon atoms, preferably at least 3 and up to 1000 carbon atoms;
e) contacting at least a part of the Fischer-Tropsch off-gas obtained in step b), optionally after cooling, with a wash fluid comprising $C_5$-$C_{20}$ hydrocarbons in a scrubber, said wash fluid comprising no or at most 5 vol % of a carbon dioxide absorbent;

f) removing wash fluid, and at least a portion of the hydrocarbons with 3 to 9 carbon atoms, and carbon monoxide and carbon dioxide, in a stream from the scrubber of step e);

g) removing the remaining off-gas in a separate stream from the scrubber of step e), and feeding at least a part of this remaining off-gas to a hydrogen production unit, whereby this remaining off-gas comprises more carbon monoxide and carbon dioxide than the stream obtained in step f);

h) providing a feed comprising at least a part of the stream obtained in step f) to a separator;

i) separating at least a part of the stream obtained in step f) in the separator of step h) into at least one light stream and one heavy stream, said light stream preferably comprising carbon monoxide and carbon dioxide and said heavy stream preferably comprising hydrocarbons with at least 3 and up to 20 carbon atoms, i.e. wash fluid comprising $C_5$-$C_{20}$ hydrocarbons and hydrocarbons with 3 to 9 carbon atoms washed from the Fischer-Tropsch off-gas obtained in step b);

j) splitting at least a part of the heavy stream obtained in step i) into at least two streams, whereby at least one stream comprises wash fluid and another stream comprises hydrocarbons with 3 to 9 carbon atoms and at most 5 vol % of hydrocarbons with 10 or more carbon atoms, said splitting being performed based on the boiling points of the compounds;

k) providing a feed comprising at least a part of the wash fluid comprising stream obtained in step j) to the scrubber of step e).

l) optionally providing a further feed comprising wash fluid to the scrubber of step e).

m) providing:
  a feed comprising at least a part of the lighter stream comprising hydrocarbons with 3 to 9 carbon atoms and at most 5 vol % of hydrocarbons with 10 or more carbon atoms, obtained in step j), and
  a feed comprising at least a part of the heavy stream obtained in step d) to a hydrocracking unit,
or providing:
  a feed comprising at least a part of the lighter stream comprising hydrocarbons with 3 to 9 carbon atoms and at most 5 vol % of hydrocarbons with 10 or more carbon atoms, obtained in step j), and at least a part of the heavy stream obtained in step d),
to a hydrocracking unit;

n) subjecting at least a part of the lighter stream comprising hydrocarbons with 3 to 9 carbon atoms and at most 5 vol % of hydrocarbons with 10 or more carbon atoms, obtained in step j), and at least a part of the heavy stream obtained in step d) to hydrocracking or hydrocracking/hydroisomerisation;

o) optionally separating at least a part of the hydrocracked or hydrocracked/hydroisomerised product obtained in step n) into at least two streams.

The present invention provides a method for the recovery of $C_3$+ hydrocarbons and hydrogen from Fischer-Tropsch off-gas. The process is energy-efficient. The process is performed in a relatively simple line-up.

DRAWING

FIG. 1 shows an overview of the process steps of a method according to the invention.

DETAILED DESCRIPTION OF THE INVENTION

The present invention provides a method for processing a Fischer-Tropsch off-gas comprising the following steps:

a) catalytic conversion of synthesis gas using a Fischer-Tropsch catalyst into a Fischer-Tropsch product comprising hydrocarbon products having 1 up to 1000 or more carbon atoms, preferably 1 up to 1000 carbon atoms;

b) separating the Fischer-Tropsch product of step a) into
  at least one hydrocarbon product stream comprising hydrocarbons with at least 3 and up to 1000 or more carbon atoms, preferably 3 up to 1000 carbon atoms, carbon monoxide, and carbon dioxide, and
  a Fischer-Tropsch off-gas, said Fischer-Tropsch off-gas comprising hydrogen, carbon monoxide, carbon dioxide, nitrogen, methane, ethane, and hydrocarbons with 3 to 9 carbon atoms,
whereby the hydrocarbon product stream comprises less carbon monoxide and carbon dioxide than the off-gas, and whereby the off-gas comprises less hydrocarbons with 3 to 9 carbon atoms than the hydrocarbon product stream;

c) providing a feed comprising at least a part of the hydrocarbon product stream obtained in step b) to a separator;

d) separating at least a part of the hydrocarbon product stream obtained in step b) in the separator of step c) into at least one light stream and one heavy stream, said light stream preferably comprising carbon monoxide and carbon dioxide and said heavy stream preferably comprising hydrocarbons with at least 3 and up to 1000 or more carbon atoms, preferably at least 3 and up to 1000 carbon atoms;

e) contacting at least a part of the Fischer-Tropsch off-gas obtained in step b), optionally after cooling, with a wash fluid comprising $C_5$-$C_{20}$ hydrocarbons in a scrubber, said wash fluid comprising no or at most 5 vol % of a carbon dioxide absorbent;

f) removing wash fluid, and at least a portion of the hydrocarbons with 3 to 9 carbon atoms, and carbon monoxide and carbon dioxide, in a stream from the scrubber of step e);

g) removing the remaining off-gas in a separate stream from the scrubber of step e), and feeding at least a part of this remaining off-gas to a hydrogen production unit, whereby this remaining off-gas comprises more carbon monoxide and carbon dioxide than the stream obtained in step f);

h) providing a feed comprising at least a part of the stream obtained in step f) to a separator;

i) separating at least a part of the stream obtained in step f) in the separator of step h) into at least one light stream and one heavy stream, said light stream preferably comprising carbon monoxide and carbon dioxide and said heavy stream preferably comprising hydrocarbons with at least 3 and up to 20 carbon atoms, i.e. wash fluid comprising $C_5$-$C_{20}$ hydrocarbons and hydrocarbons with 3 to 9 carbon atoms washed from the Fischer-Tropsch off-gas obtained in step b);

j) splitting at least a part of the heavy stream obtained in step i) into at least two streams, whereby at least one stream comprises wash fluid and another stream comprises hydrocarbons with 3 to 9 carbon atoms and at most 5 vol % of hydrocarbons with 10 or more carbon atoms, said splitting being performed based on the boiling points of the compounds;

k) providing a feed comprising at least a part of the wash fluid comprising stream obtained in step j) to the scrubber of step e).

l) optionally providing a further feed comprising wash fluid to the scrubber of step e).

m) providing:
- a feed comprising at least a part of the lighter stream comprising hydrocarbons with 3 to 9 carbon atoms and at most 5 vol % of hydrocarbons with 10 or more carbon atoms, obtained in step j), and
- a feed comprising at least a part of the heavy stream obtained in step d) to a hydrocracking unit, or providing:
- a feed comprising at least a part of the lighter stream comprising hydrocarbons with 3 to 9 carbon atoms and at most 5 vol % of hydrocarbons with 10 or more carbon atoms, obtained in step j), and at least a part of the heavy stream obtained in step d), to a hydrocracking unit;

n) subjecting at least a part of the lighter stream comprising hydrocarbons with 3 to 9 carbon atoms and at most 5 vol % of hydrocarbons with 10 or more carbon atoms, obtained in step j), and at least a part of the heavy stream obtained in step d) to hydrocracking or hydrocracking/hydroisomerisation;

o) optionally separating at least a part of the hydrocracked or hydrocracked/hydroisomerised product obtained in step n) into at least two streams.

The present invention provides a method for the recovery of $C_3$+ hydrocarbons and hydrogen from Fischer-Tropsch off-gas. The process is energy-efficient. The process is performed in a relatively simple line-up.

In step a) synthesis gas is subjected to catalytic conversion using a Fischer-Tropsch catalyst. The syngas is converted into a Fischer-Tropsch product. Catalytic conversion is preferably performed by providing syngas to a Fischer-Tropsch reactor and providing the following process conditions in the reactor: a temperature in the range from 125 to 350° C., a pressure in the range from 5 to 150 bar absolute, and a gaseous hourly space velocity in the range from 500 to 10000 Nl/l/h.

Preferably the Fischer-Tropsch catalyst comprises a Group VIII metal component, more preferably cobalt, iron and/or ruthenium, most preferably cobalt. References to the Periodic Table and groups thereof used herein refer to the previous IUPAC version of the Periodic Table of Elements such as that described in the 68th Edition of the Handbook of Chemistry and Physics (CPC Press).

Typically, the catalysts comprise a catalyst carrier. The catalyst carrier is preferably porous, such as a porous inorganic refractory oxide, more preferably alumina, silica, titania, zirconia or combinations thereof, most preferably titania.

The optimum amount of catalytically active metal present on the carrier depends inter alia on the specific catalytically active metal. Typically, the amount of cobalt present in the Fischer-Tropsch catalyst may range from 1 to 100 parts by weight per 100 parts by weight of carrier material, preferably from 10 to 50 parts by weight per 100 parts by weight of carrier material. In case the catalyst comprises cobalt and titania, the amount of cobalt preferably is in the range of between 10 weight percent (wt %) and 35 wt % cobalt, more preferably between 15 wt % and 30 wt % cobalt, calculated on the total weight of titania and cobalt.

The obtained Fischer-Tropsch product comprises paraffinic compounds ranging from methane to high molecular weight hydrocarbons. The obtained high molecular weight hydrocarbons can comprise up to 1000 carbon atoms or more. The Fischer-Tropsch product preferably comprises hydrocarbon products having 1 to 1000 carbon atoms, preferably 1 to 500 carbon atoms, more preferably 1 to 200 carbon atoms.

Product may be withdrawn from a Fischer-Tropsch reactor through a single outlet or through several outlets in the reactor. Product may be withdrawn at different heights of a Fischer-Tropsch reactor. Product may be separated and/or fractionated after withdrawal from a Fischer-Tropsch reactor. At the Fischer-Tropsch reaction temperature, a part of the product will be in a liquid state while another part of the product will be in a gaseous state. When product is withdrawn from a Fischer-Tropsch system some unconverted syngas may leave the system as well. Further, gaseous components such as carbon dioxide, nitrogen and argon may leave the system when product is withdrawn from a Fischer-Tropsch system.

An example of a product stream that may be obtained is a stream comprising waxy hydrocarbons and possibly heavy oxygenates. Such streams may be subjected to an upgrading step. The upgrading step may result in a decrease in viscosity, a decrease in pour point or cloud point, and/or a decrease in (end) boiling point. A stream comprising waxy hydrocarbons may be subjected to a hydrogenation step, a hydrocracking step or a hydrocracking/hydroisomerisation step, or a combination of hydrogenation and hydrocracking or hydrocracking/hydroisomerisation.

Another example of a product stream that may be obtained is a stream comprising light hydrocarbons and possibly light oxygenates. A stream comprising light hydrocarbons may be used as such, or may be subjected to a treatment with hydrogen.

A further example of a product stream that may be obtained is a stream comprising water.

Another example of a product stream that may be obtained is a stream comprising unconverted syngas. This stream is also referred to as off-gas or tail gas. Off-gas often comprises unconverted hydrogen, unconverted carbon monoxide, carbon dioxide, nitrogen, methane, and hydrocarbons comprising 2 to 9 carbon atoms. Off-gas often also comprises oxygenates comprising 2 to 9 carbon atoms.

A stream comprising water and an off-gas stream may be obtained by withdrawing a gaseous stream from the Fischer-Tropsch product, and then cooling this gaseous stream until water condenses. The liquid water and the off-gas can be easily separated using for example a gas-liquid separation unit.

In step b) the Fischer-Tropsch product of step a) is separated into at least one hydrocarbon product stream and a Fischer-Tropsch off-gas. This may be performed by withdrawing effluent through a single outlet in a Fischer-Tropsch reactor, followed by separation in a separation unit into at least one hydrocarbon product stream and a Fischer-Tropsch off-gas. Alternatively, this may be performed by withdrawing effluent through several outlets in a Fischer-Tropsch reactor. Effluent may be withdrawn at different heights of a Fischer-Tropsch reactor. In case effluent is withdrawn through several outlets, one stream may be considered Fischer-Tropsch off-gas. Alternatively, in case effluent is withdrawn through several outlets the stream(s) coming from one or more outlets may be separated and/or fractionated after withdrawal from the Fischer-Tropsch reactor into at least one hydrocarbon product stream and a Fischer-Tropsch off-gas.

The Fischer-Tropsch product of step a) from which hydrocarbon product stream(s) and off-gas are separated in step b) may be Fischer-Tropsch product from one Fischer-Tropsch reactor, but it may also be combined product from several Fischer-Tropsch reactors.

A part of the off-gas obtained from a reactor may be recycled to the same reactor. A part of the off-gas obtained from one reactor may be fed to another reactor. The off-gas obtained from such a second reactor may be recycled to the first and/or to the second reactor, and/or it may be fed to a third reactor.

Gaseous components that do not take part in the Fischer-Tropsch reaction are considered to be inert toward this reaction; they are also referred to as inerts. Examples of such inerts are nitrogen and carbon dioxide.

Due to the presence of inerts in off-gas, off-gas preferably is not completely recycled since inerts would accumulate and adversely affect the production of hydrocarbons in the Fischer-Tropsch reactor(s). Therefore a portion of the Fischer-Tropsch off-gas is often removed from the Fischer-Tropsch process.

As mentioned above, in step b) the Fischer-Tropsch product of step a) is separated into at least one hydrocarbon product stream and a Fischer-Tropsch off-gas. The separation may, for example, be performed by means of a simple gas-liquid separation unit or by means of distillation. Additionally or alternatively the Fischer-Tropsch product may be separated by withdrawing a liquid hydrocarbon product stream through one outlet of the reactor, and by withdrawing a gaseous stream through another outlet of the reactor.

The separated hydrocarbon product stream(s) preferably comprises hydrocarbons with at least 3 carbon atoms, preferably at least 4 carbon atoms. The separated hydrocarbon product stream(s) preferably comprises hydrocarbons with up to 1000 or more carbon atoms, more preferably up to 1000 carbon atoms, even more preferably up to 500 carbon atoms, still more preferably up to 200 carbon atoms. The separated hydrocarbon product stream may comprise a minor amount of methane, ethane, CO, and/or CO2. The aim of separation step b) is to separate such gaseous components from the hydrocarbon product stream. Nevertheless, a minor amount, preferably less than 10%, more preferably less than 5%, even more preferably less than 1% of the amount of methane, ethane, CO, and/or CO2 originally present in the Fischer-Tropsch product of step a), may be present in the hydrocarbon product stream. Therefore the hydrocarbon product stream is subjected to separating step d).

The separated Fischer-Tropsch off-gas comprises hydrogen, carbon monoxide, carbon dioxide, nitrogen, methane, and ethane. It may also comprise further gaseous components such as argon. The aim of separation step b) is to separate off-gas from the hydrocarbon product stream with at least 3 carbon atoms. Nevertheless, a part of the small hydrocarbons originally present in the Fischer-Tropsch product of step a) may be present in the off-gas. The separated Fischer-Tropsch off-gas may comprise hydrocarbons with 3 to 9 carbon atoms. Therefore the off-gas is subjected to steps e) to j).

One of the aims of the present invention is the removal of C3+ hydrocarbons from Fischer-Tropsch off-gas. The off-gas may comprise oxygenates, also referred to as oxygenated compounds, such as methanol and dimethyl ether. In case the off-gas comprises C3+ oxygenates, C3+ oxygenates may also be removed with the process of the present invention.

Preferably less than 10%, more preferably less than 5%, even more preferably less than 1% of the amount of 3 to 9 carbon atoms originally present in the Fischer-Tropsch product of step a) may be present in the off-gas.

Hence, in step b the Fischer-Tropsch product of step a) is separated into
at least one hydrocarbon product stream comprising hydrocarbons with at least 3 and up to 1000 or more carbon atoms, preferably 3 up to 1000 carbon atoms, carbon monoxide, and carbon dioxide, and
a Fischer-Tropsch off-gas, said Fischer-Tropsch off-gas comprising hydrogen, carbon monoxide, carbon dioxide, nitrogen, methane, ethane, and hydrocarbons with 3 to 9 carbon atoms,
whereby the hydrocarbon product stream comprises less carbon monoxide and carbon dioxide than the off-gas, and whereby the off-gas comprises less hydrocarbons with 3 to 9 carbon atoms than the hydrocarbon product stream.

In step c) a feed comprising at least a part of the hydrocarbon product stream obtained in step b) is provided to a separator. A portion or the whole hydrocarbon stream obtained in step b) may be provided to the separator in step c). Additionally or alternatively, a further hydrocarbon product stream may be provided to the separator. The separator may, for example, be a gas-liquid separator or a distillation unit.

In step d) separation takes place in the separator of step c). The separator comprises at least a part of the hydrocarbon product stream obtained in step b).

In step d) at least a part of the hydrocarbon product stream obtained in step b) is separated into at least one light stream and one heavy stream, said light stream preferably comprising carbon monoxide and carbon dioxide and said heavy stream preferably comprising hydrocarbons with at least 3 and up to 1000 or more carbon atoms, preferably at least 3 and up to 1000 carbon atoms.

The aim of separation step d) is to further separate gaseous components of such as methane, ethane, CO, and/or CO2 from the hydrocarbon product stream, as a minor amount of these components may be present in the hydrocarbon product stream after separation step b).

The separation of step d) results in at least one light stream and one heavy stream, whereby said light stream preferably comprises carbon monoxide and carbon dioxide and said heavy stream preferably comprises hydrocarbons with at least 3 carbon atoms. The light stream obtained in step d) more preferably comprises carbon monoxide, carbon dioxide, methane, and hydrocarbons containing 2 carbon atoms, and optionally oxygenates comprising 2 carbon atoms. The heavy stream obtained in step d) preferably comprises hydrocarbons with at least 3 carbon atoms, more preferably at least 4 carbon atoms, and preferably up to 1000 or more carbon atoms, more preferably up to 1000 carbon atoms, even more preferably up to 500 carbon atoms, still more preferably up to 200 carbon atoms.

In step d) at least a part of the hydrocarbon product stream obtained in step b) may be separated in the separator of step c) into at least three streams, namely a light stream, one or more intermediate streams and a heavy stream. In that case at least a part of at least one of the intermediate streams obtained in step d), optionally after hydrogenation and/or further separation, may be used as wash fluid in step e). In case at least a part of at least one of the intermediate streams in step d) is subjected to hydrogenation and optionally further separation, light detergent feedstock (LDF) may be obtained. LDF is highly suitable as wash fluid in step e).

In step e) at least a part of the Fischer-Tropsch off-gas obtained in step b) is contacted with a wash fluid in a scrubber.

Preferably the Fischer-Tropsch off-gas obtained in step b) is cooled in one or more stages before step e). During the cooling step(s) hydrocarbon product, especially $C_5+$ hydrocarbons, and/or water may be separated from the off-gas. Before cooling, the temperature of the off-gas may be 180-280° C., preferably 210-260° C. After cooling the off-gas preferably is at a temperature of 50° C. or lower.

In one embodiment, the off-gas is first cooled by 50-200° C., preferably 80-100° C. In this first cooling step the off-gas preferably is cooled to 100-160° C., more preferably to 120-140° C. Then the off-gas is cooled even further in a second cooling step in which the off-gas is cooled by 20-130° C., preferably 50-90° C. In this embodiment the off-gas is optionally subjected to a third cooling step.

One of the aims of the present invention is the removal of $C_3+$ hydrocarbons from Fischer-Tropsch off-gas comprising hydrogen, carbon monoxide, carbon dioxide, nitrogen, methane, ethane, and $C_3+$ hydrocarbons. The off-gas may additionally comprise other components such as water and/or argon. The off-gas may comprise oxygenates, also referred to as oxygenated compounds, such as methanol and dimethyl ether. In case the off-gas comprises $C_3+$ oxygenates, $C_3+$ oxygenates may also be removed with the process of the present invention.

The off-gas that is contacted with the wash fluid in step e) preferably is in a gaseous state at a pressure between 1 and 80 bar, preferably between 20 and 70 bar, and a temperature above 0° C. and below 50° C., preferably a temperature above 10° C. and below 40° C. Preferably at most 99 volume %, more preferably at most 95 volume %, even more preferably at most 90 volume % of the hydrocarbons in the off-gas that is contacted with the wash fluid in step e) consists of hydrocarbons comprising 3 to 9 carbon atoms, hydrocarbons comprising 2 carbon atoms, and methane. Preferably at least 0.005 volume %, more preferably at least 0.01 volume %, even more preferably at least 0.1 volume %, still more preferably at least 1 volume %, most preferably at least 10 volume % of the hydrocarbons in the off-gas that is contacted with the wash fluid in step e) consists of hydrocarbons comprising 3 to 9 carbon atoms.

The wash fluid used in step e) may comprise at most 5 volume % of a carbon dioxide absorbent, such as an amine. The wash fluid used in step e) preferably does not comprise a carbon dioxide absorbent. The wash fluid thus preferably does not comprise an amine, such as an alkanol-amine.

The wash fluid used in step e) comprises hydrocarbons. Preferably at least 60 weight %, more preferably at least 70 weight %, even more preferably at least 80 weight % of the hydrocarbons in the wash fluid consists of $C_5$-$C_{20}$ hydrocarbons, preferably $C_8$-$C_{20}$ hydrocarbons, more preferably $C_8$-$C_{14}$ hydrocarbons.

The wash fluid used in step e) preferably is kerosene, more preferably kerosene comprising at least 80 weight % $C_6$-$C_{16}$ hydrocarbons, even more preferably kerosene comprising at least 80 weight % $C_8$-$C_{16}$ hydrocarbons, still more preferably kerosene comprising at least 80 weight % $C_8$-$C_{14}$ hydrocarbons or $C_{10}$-$C_{14}$ hydrocarbons.

In one embodiment, the wash fluid used in step e) comprises at least 80 weight % $C_6$-$C_{16}$ hydrocarbons, more preferably at least 80 weight % $C_8$-$C_{16}$ hydrocarbons, even more preferably comprises at least 80 weight % $C_8$-$C_{14}$ hydrocarbons or at least 80 weight % $C_{10}$-$C_{14}$ hydrocarbons. This wash fluid may optionally be hydrogenated before it is used as wash fluid.

In another embodiment, the wash fluid used in step e) is light detergent feedstock (LDF), even more preferably LDF comprising at least 80 weight % $C_{10}$-$C_{14}$ hydrocarbons, still more preferably LDF comprising at least 80 weight % $C_{10}$-$C_{13}$ hydrocarbons.

The wash fluid used in step e) preferably is kerosene, more preferably kerosene comprising at least 80 weight % $C_6$-$C_{16}$ hydrocarbons, even more preferably kerosene comprising at least 80 weight % $C_8$-$C_{16}$ hydrocarbons, still more preferably kerosene comprising at least 80 weight % $C_8$-$C_{14}$ hydrocarbons.

Preferably the initial boiling point of the wash fluid is higher than 80° C., more preferably higher than 100° C. The higher the initial boiling point of the wash fluid the easier it is to separate $C_3+$ hydrocarbons from the wash fluid.

The wash fluid may be kerosene obtained in step o). Alternatively, the wash fluid may be LDF obtained by subjecting at least one of the intermediate streams that may be obtained in step d) to hydrogenation and optionally further separation.

The Fischer-Tropsch off-gas preferably is at a temperature of 0-50° C., preferably 10-40° C. when it enters the scrubber. Preferably the pressure of the Fischer-Tropsch off-gas is 1-80 bar, preferably 20-70 bar, when it enters the scrubber. Preferably the scrubber is adapted to provide maximum contact between the off-gas and the wash fluid with minimum pressure drop. Preferably the pressure during the contacting step is the same as the off-gas pressure.

In step f) wash fluid and at least a portion of the $C_3+$ hydrocarbons are removed in a stream from the scrubber of step e). The process of the present invention proofed to be very effective in removing $C_3+$ hydrocarbons from the off-gas.

After removal of at least a portion of the $C_3+$ hydrocarbons from the off-gas by means of the wash fluid, the remaining off-gas is removed in a separate stream from the scrubber of step e). This is performed in step g). The removal of the remaining off-gas may, for example, be performed when regenerating the scrubber of step e). A part of the stream comprising the remaining off-gas may be used for the production of electrical power, in an expanding/combustion process such as in a gas turbine, as burner fuel, or it may be fed to a syngas production process. The energy generated in the process may be used for own use or for export to local customers. Part of the energy could be used for the compression of an oxygen containing gas.

The aim of steps e) and f) is to wash hydrocarbons with 3 to 9 carbon atoms from the Fischer-Tropsch off-gas. Nevertheless, a minor amount, preferably less than 10%, more preferably less than 5%, even more preferably less than 1% of the amount of methane, ethane, CO, and/or CO2 originally present in the Fischer-Tropsch off-gas of step b), may be present in the stream obtained in step f). Therefore the stream obtained in step f) is subjected to separating step i).

The remaining off-gas that is removed in step g) in a separate stream from the scrubber of step e) comprises more carbon monoxide and carbon dioxide than the stream obtained in step f). The remaining off-gas that is removed in step g) may comprise at least 80 vol %, preferably at least 90 vol %, more preferably at least 95 vol % of the carbon monoxide and carbon dioxide that were originally present in the Fischer-Tropsch off-gas obtained in step b).

At least a part of the remaining off-gas that is removed from the scrubber in step g) is fed to a hydrogen production unit. This may, for example, be a steam methane reformer (SMR) or an autothermal reformer (ATR). In the hydrogen production unit, the methane and ethane present in the remaining off-gas that is removed from the scrubber in step g) can be reacted so that hydrogen and carbon monoxide are obtained. The carbon dioxide present in the remaining off-gas is useful in the reaction of the methane and ethane. After hydrogen production in the hydrogen production unit the resulting gas may be subjected to a water-gas shift reaction to convert carbon monoxide and water into carbon dioxide and hydrogen.

After the hydrogen production and optional water-gas shift reaction, hydrogen can be separated, for example using pressure swing absorption (PSA). Also carbon dioxide can be separated at this stage, for example using the same PSA.

In step h) at least a part of the stream obtained in step f) is fed to a separator.

In step i) separation takes place in the separator of step h). The separator comprises at least a part of the stream obtained in step f), and optionally other materials. The aim of separation step i) is to further separate gaseous components of such as methane, ethane, CO, and/or CO2 from the stream obtained in step f), as a minor amount of these components may be present after steps e) and f). The separation results in at least one light stream and one heavy stream, whereby said light stream preferably comprises carbon monoxide and carbon dioxide and said heavy stream preferably comprises hydrocarbons with at least 3 and up to 20 carbon atoms, i.e. hydrocarbons with 3 to 9 carbon atoms washed from the Fischer-Tropsch off-gas obtained in step b) as well as wash fluid.

The light stream obtained in step i) more preferably comprises carbon monoxide, carbon dioxide, methane, and hydrocarbons containing 2 carbon atoms, and optionally oxygenates comprising 2 carbon atoms. The heavy stream obtained in step i) comprises $C_3+$ hydrocarbons resulting from the stream obtained in step f).

The separator(s) used in step i) may be a stripper, for example a light ends stripper, a flasher, and/or a distillation unit, or any other suitable separation unit. Preferably the separator, or one of the separators, used in step i) is a stripper, more preferably a light ends stripper.

The separation(s) in step i) preferably take(s) place at a pressure in the range of from 1 to 20 bar, more preferably 1 to 5 bar, even more preferably at about 1 bar.

In step j) splitting is performed in a splitting unit. Splitting step j) preferably results in two streams. The splitting unit used in step j) may be a splitter, stripper, a flasher, and/or a distillation unit, or any other suitable separation unit that can be used to separate hydrocarbon streams based on the boiling points of the components. Preferably a splitter is used in step j).

In step j) the heavy stream obtained in step i) is split based on the boiling points of the components. The heavy stream obtained in step i) comprising hydrocarbons with 3 to 9 carbon atoms as well as wash fluid is split in step j) in wash fluid and a lighter stream comprising hydrocarbons with 3 to 9 carbon atoms. The lighter stream comprising hydrocarbons with 3 to 9 carbon atoms comprises at most 5 vol % of hydrocarbons with 10 or more carbon atoms.

In step k) a feed comprising at least a part of the wash fluid comprising stream obtained in step j) is provided to the scrubber of step e). A further feed comprising wash fluid may be provided to the scrubber of step e) in optional step l). Such a further feed comprising wash fluid may be a make up stream. During the process it may be desired to add some extra wash fluid, and this may be performed by providing a further feed comprising wash fluid to the scrubber of step e).

In case the wash fluid is kerosene, the further feed that may be added in step l) preferably is kerosene. In case the wash fluid is kerosene, the further feed that may be added in step l) preferably is at least a part of one of the streams obtained in optional step o), preferably kerosene obtained in optional step o).

In case the wash fluid is LDF, the further feed that may be added in step l) preferably is LDF. In case the wash fluid is LDF, preferably the further feed that may be added in step l) is at least a part of at least one of the intermediate streams that may be obtained in step d), optionally after hydrogenation and/or further separation. More preferably the further feed in that case that may be added in step l) is LDF obtained after hydrogenation and optional further separation of at least one of the intermediate streams that may be obtained in step d).

Optionally a part of the lighter stream comprising hydrocarbons with 3 to 9 carbon atoms, and at most 5 vol % of hydrocarbons with 10 or more carbon atoms, obtained in step j) is subjected to hydrogenation to obtain one or more products such as LPG.

In step m) at least a part of the lighter stream comprising hydrocarbons with 3 to 9 carbon atoms and at most 5 vol % of hydrocarbons with 10 or more carbon atoms, obtained in step j), and a feed comprising at least a part of the heavy stream obtained in step d) are provided to a hydrocracking unit. These streams may be fed separately to the same hydrocracking unit. Additionally or alternatively these streams may be combined before being fed to a hydrocracking unit. If desired additional feed streams may be fed to the same hydrocracking unit.

In step n) at least a part of the lighter stream comprising hydrocarbons with 3 to 9 carbon atoms and at most 5 vol % of hydrocarbons with 10 or more carbon atoms, obtained in step j), and at least a part of the heavy stream obtained in step d) are subjected to hydrocracking or hydrocracking/hydroisomerisation.

Preferably at least a part of the lighter stream comprising hydrocarbons with 3 to 9 carbon atoms obtained in step j) and at least a part of the stream heavy obtained in step d) are fed to a reaction zone where it is contacted with hydrogen at a temperature in the range of 175 to 400° C. and a pressure in the range of 20 to 250 bar. Preferably a catalyst is present in the reaction zone. More preferably a catalyst comprising platinum and/or palladium, an amorphous silica/alumina, and optionally zeolite beta, is present in the reaction zone.

Preferably in step n) at least a part of the lighter stream comprising hydrocarbons with 3 to 9 carbon atoms obtained in step j) and at least a part of the heavy stream obtained in step d) are subjected to a hydrocracking process to convert hydrocarbons boiling above 315° C. into hydrocarbons boiling below 315° C. More preferably hydrocarbons boiling above 305° C. are converted into hydrocarbons boiling below 305° C. Even more preferably hydrocarbons boiling above 250° C. are converted into hydrocarbons boiling below 250° C. Still more preferably hydrocarbons boiling above 240° C. are converted into hydrocarbons boiling below 240° C.

During such a hydrocracking process also hydroisomerisation will occur. In the hydrocracking/hydroisomerisation process, hydrocarbon fuels are prepared from the hydrocarbon product of the one or more heavy Fischer-Tropsch fractions by hydrocracking and hydroisomerising the product with hydrogen in the presence of a suitable catalyst. Typically, the catalyst comprises as catalytically active component one or more metals selected from Groups VIB and VIII of the Periodic Table of Elements, in particular one or more metals selected from molybdenum, tungsten, cobalt, nickel, ruthenium, iridium, osmium, platinum and palladium. Preferably, the catalyst comprises one or more metals selected from nickel, platinum and palladium as the catalytically active component. Catalysts comprising platinum as the catalytically active component have been found to be particularly suitable.

Catalysts for the hydrocracking process typically comprise a refractory metal oxide as a carrier. The carrier material may be amorphous or crystalline. Suitable carrier materials include silica, alumina, silica-alumina, zirconia, titania and mixtures thereof. The carrier may comprise one or more zeolites, either alone or in combination with one or more of the aforementioned carrier materials. Preferred carrier materials for inclusion in the catalyst are silica, alumina and silica-alumina. A particularly preferred catalyst comprises platinum supported on an amorphous silica-alumina carrier.

As catalyst for the hydrocracking process a catalyst comprising zeolite beta may be used. In that case the catalyst preferably comprises 0.1-15 wt % of a zeolite beta, calculated on the weight of the catalyst. More preferably the zeolite beta in the catalyst is present in an amount of at least 0.5 wt %, more in particular in an amount of at least 1 wt %, and/or in an amount of at most 10 wt %, more in particular in an amount of at most 8 wt %, even more particular in an amount of at most 4 wt %, calculated on the weight of the catalyst.

The catalyst for the hydrocracking process may comprise 0.005 to 5.0 wt % of a Group VIII noble metal on a carrier, the carrier comprising 0.1-15 wt % of a zeolite beta and at least 40 wt % of an amorphous silica-alumina, calculated on the weight of the catalyst. Preferably such a catalyst comprises 0.005 to 5.0 wt % platinum and/or palladium. Preferably the zeolite beta in such a catalyst is present in an amount of at least 0.5 wt %, more in particular in an amount of at least 1 wt %, and/or in an amount of at most 10 wt %, more in particular in an amount of at most 8 wt %, even more particular in an amount of at most 4 wt %. The zeolite beta in the catalyst preferably has a silica:alumina molar ratio of at least 50, more preferably at least 75 and at most 500, calculated as $SiO_2$ and $Al_2O_3$. The amorphous silica-alumina preferably has an alumina content, calculated as $Al_2O_3$, of 5-70 wt %.

In the hydrocracking/hydroisomerisation process, the hydrocarbons are contacted with hydrogen in the presence of the catalyst at elevated temperature and pressure. The temperature will preferably be in the range of from 175 to 400° C., more preferably 200 to 400° C., even more preferably from 275 to 375° C. The pressure will preferably be in the range of from 20 to 250 bars, more preferably from 40 to 200 bars, even more preferably from 40 to 100 bars. Hydrogen preferably is supplied at a gas hourly space velocity of from 100 to 10000 Nl/l/hr, more preferably from 500 to 5000 Nl/l/hr. The hydrocarbon feed preferably is provided at a weight hourly space velocity of from 0.1 to 5 kg/l/hr, more preferably from 0.25 to 2 kg/l/hr. The ratio of hydrogen to hydrocarbon feed preferably is from 100 to 5000 Nl/kg, more preferably from 250 to 2500 Nl/kg.

The degree of hydrocracking occurring in the hydrocracking/hydroisomerisation step may be measured by determining the degree of conversion of the fraction boiling above 370° C. Typically, the hydrocracking/hydroisomerisation stage is operated at a conversion of at least 40%.

In optional step o) at least a part of the hydrocracked and/or hydrocracked/hydroisomerised product obtained in step n) is separated into at least two streams. This may be performed in a separation unit. The hydrocarbon fuel produced in the hydrocracking process of step n) will typically comprise hydrocarbons having boiling points lying in a number of different fuel fractions, for example naphtha, kerosene and gasoil fractions. Separation of the hydrocarbon fuel into the appropriate fractions may be conveniently achieved using distillation techniques well known in the art.

The separator(s) used in step o) may be a stripper, for example a light ends stripper, a flasher, and/or a distillation unit, or any other suitable separation unit. The separation unit used in step o) preferably is a distillation unit, for example a synthetic crude distiller.

One of the streams obtained in step o) may be a stream which is useful as wash fluid in step e). Preferably one of the streams obtained is kerosene, more preferably kerosene comprising at least 80 weight % $C_6$-$C_{16}$ hydrocarbons, even more preferably kerosene comprising at least 80 weight % $C_8$-$C_{16}$ hydrocarbons, still more preferably kerosene comprising at least 80 weight % $C_8$-$C_{14}$ hydrocarbons. At least a part of this stream may be used as wash fluid in step e).

FIG. 1 illustrates an overview of an example for a line-up in which the method of the present invention may be performed. Also the indicated flows are examples of flows that may be generated in the method of the present invention. Fischer-Tropsch synthesis takes place in reactor (10). Fischer-Tropsch off-gas (1) and a hydrocarbon product stream (2) are separated from the reactor (10). The off-gas (1) is fed to a scrubber (20). The off-gas (1) comprises hydrogen, carbon monoxide, carbon dioxide, nitrogen, and C3+ hydrocarbons. The hydrocarbon stream (2) is fed to a separation unit (30). Wash fluid and at least a portion of the $C_3$+ hydrocarbons of the off-gas are removed in a stream (25) from the scrubber (20) to the separation unit (70). Remaining off-gas is removed in a stream (21) from the scrubber (20).

At least a part of the remaining off-gas that is removed from the scrubber (21) is fed to a hydrogen production unit (90). This may, for example, be a steam methane reformer (SMR) or an autothermal reformer (ATR). After hydrogen production the resulting gas may be subjected to a water-gas shift reaction (not shown), followed by hydrogen removal, for example using a PSA (not shown).

A light stream (71) and a heavy stream (72) are removed from separation unit (70). The heavy stream (72) is split in splitter (80) into a stream comprising wash fluid (26) and a stream comprising hydrocarbons with 3 to 10 carbon atoms (81). The stream comprising wash fluid (26) may, for example, comprise hydrocarbons with 10 to 14 carbon atoms.

At least a part of stream (26) is used as wash fluid in scrubber (20). The stream comprising hydrocarbons with 3 to 10 carbon atoms (81) is fed to hydrocracking unit (40).

A heavy stream (3) and a light stream (31) are removed from the separator (30). The heavy stream (3) is fed to a hydrocracking/hydroisomerisation unit (40). A hydrogen comprising stream (41) is fed to unit (40).

At least a part of the hydrocracked/hydroisomerised product (4) is separated into at least two streams in separation unit (50).

The invention claimed is:

1. A method for processing a Fischer-Tropsch off-gas comprising the following steps:
   a) catalytic conversion of synthesis gas using a Fischer-Tropsch catalyst into a Fischer-Tropsch product comprising hydrocarbon products having 1 up to 1000 or more carbon atoms;
   b) separating the Fischer-Tropsch product of step a) into—at least one hydrocarbon product stream comprising hydrocarbons with at least 3 and up to 1000 or more carbon atoms, carbon monoxide, and carbon dioxide, and a Fischer-Tropsch off-gas, said Fischer-Tropsch off-gas comprising hydrogen, carbon monoxide, carbon dioxide, nitrogen, methane, ethane, and hydrocarbons with 3 to 9 carbon atoms, whereby the hydrocarbon product stream comprises less carbon monoxide and carbon dioxide than the off-gas, and whereby the off-gas comprises less hydrocarbons with 3 to 9 carbon atoms than the hydrocarbon product stream;

c) providing a feed comprising at least a part of the hydrocarbon product stream obtained in step b) to a separator;

d) separating at least a part of the hydrocarbon product stream obtained in step b) in the separator of step c) into at least one light stream and one heavy stream, said light stream comprising carbon monoxide and carbon dioxide and said heavy stream comprising hydrocarbons with at least 3 and up to 1000 or more carbon atoms;

e) contacting at least a part of the Fischer-Tropsch off-gas obtained in step b), with a wash fluid comprising $C_5$-$C_{20}$ hydrocarbons in a scrubber, said wash fluid comprising no carbon dioxide absorbent;

f) removing wash fluid, and at least a portion of the hydrocarbons with 3 to 9 carbon atoms, and carbon monoxide and carbon dioxide, in a stream from the scrubber of step e);

g) removing the remaining off-gas in a separate stream from the scrubber of step e), and feeding at least a part of this remaining off-gas to a hydrogen production unit, whereby this remaining off-gas comprises more carbon monoxide and carbon dioxide than the stream obtained in step f);

h) providing a feed comprising at least a part of the stream obtained in step f) to a separator;

i) separating at least a part of the stream obtained in step f) in the separator of step h) into at least one light stream and one heavy stream, said light stream comprising carbon monoxide and carbon dioxide and said heavy stream comprising hydrocarbons with at least 3 and up to 20 carbon atoms, i.e. wash fluid comprising $C_5$-$C_{20}$ hydrocarbons and hydrocarbons with 3 to 9 carbon atoms washed from the Fischer-Tropsch off-gas obtained in step b);

j) splitting at least a part of the heavy stream obtained in step i) into at least two streams, whereby at least one stream comprises wash fluid and another stream comprises hydrocarbons with 3 to 9 carbon atoms and at most 5 vol % of hydrocarbons with 10 or more carbon atoms, said splitting being performed based on the boiling points of the compounds;

k) providing a feed comprising at least a part of the wash fluid comprising stream obtained in step j) to the scrubber of step e);

m) providing:
a feed comprising at least a part of the lighter stream comprising hydrocarbons with 3 to 9 carbon atoms and at most 5 vol % of hydrocarbons with 10 or more carbon atoms, obtained in step j), and
a feed comprising at least a part of the heavy stream obtained in step d) to a hydrocracking unit,
or providing:
a feed comprising at least a part of the lighter stream comprising hydrocarbons with 3 to 9 carbon atoms and at most 5 vol % of hydrocarbons with 10 or more carbon atoms, obtained in step j), and at least a part of the heavy stream obtained in step d),
to a hydrocracking unit;

n) subjecting at least a part of the lighter stream comprising hydrocarbons with 3 to 9 carbon atoms and at most 5 vol % of hydrocarbons with 10 or more carbon atoms, obtained in step j), and at least a part of the heavy stream obtained in step d) to hydrocracking or hydrocracking/hydroisomerisation.

2. A method according to claim 1, wherein at least 60 weight % of the hydrocarbons in the wash fluid consists of $C_5$-$C_{20}$ hydrocarbons.

3. A method according to claim 1, wherein the wash fluid used in step e) is kerosene.

4. A method according to claim 1, wherein a separating step o) is performed, separating at least a part of the hydrocracked or hydrocracked/hydroisomerised product obtained in step n) into at least two streams;
and in which kerosene obtained in step o) is used as wash fluid in step e).

5. A method according to claim 1, wherein the wash fluid used in step e) is light detergent feedstock (LDF).

6. A method according to claim 1, wherein in step d) at least a part of the hydrocarbon product stream obtained in step b) is separated in the separator of step c) into at least three streams, namely a light stream, one or more intermediate streams and a heavy stream, and wherein at least a part of at least one of the intermediate streams obtained in step d) is used as wash fluid in step e).

7. A method according to claim 1 comprising a step 1) in which a further feed comprising wash fluid is provided to the scrubber of step e).

* * * * *